United States Patent
Hull

[15] 3,689,629
[45] Sept. 5, 1972

[54] SOLVENT SURFACE TREATMENT OF MICROPOROUS POLYURETHANE ELASTOMER

[72] Inventor: Graham Rodney Hull, North Lynn, King's Lynn, Norfolk, England

[73] Assignee: Porvair Limited, Norfolk, England

[22] Filed: Aug. 15, 1969

[21] Appl. No.: 850,666

Related U.S. Application Data

[63] Continuation-in-part of Ser. No. 621,124, March 7, 1967, abandoned.

[30] Foreign Application Priority Data
Mar. 7, 1966 Great Britain..............9976/66

[52] U.S. Cl.................264/341, 117/161 KP, 156/2, 260/2.5 AY, 264/48, 264/321
[51] Int. Cl..............................................B29c 25/00
[58] Field of Search ..264/48, 321, 341, 41; 117/161; 156/2

[56] References Cited

UNITED STATES PATENTS

| | | | |
|---|---|---|---|
| 2,858,571 | 11/1958 | Dunbar | 264/48 X |
| 2,926,389 | 3/1960 | Garlington | 264/48 |
| 3,000,757 | 9/1961 | Johnston | 264/41 UX |
| 3,209,686 | 10/1965 | Arthurs | 264/341 X |
| 3,296,016 | 1/1967 | Murphy | 264/41 UX |
| 3,301,935 | 1/1967 | Stoeckhert | 264/48 X |
| 3,388,100 | 6/1968 | Thoma | 264/41 UX |

Primary Examiner—Julius Frome
Assistant Examiner—Paul A. Leipold
Attorney—Watson, Cole, Grindle & Watson

[57] ABSTRACT

A microporous polyurethane coating is given an appearance resembling that of calf grain leather by being sprayed with a solvent for the polyurethane, for example N-N dimethylformamide and heating the surface to evaporate the solvent. The preferred spray has a narrow range of droplet sizes defined in the specification.

7 Claims, No Drawings

SOLVENT SURFACE TREATMENT OF MICROPOROUS POLYURETHANE ELASTOMER

This application is a continuation-in-part of my application Ser. No. 621,124 filed Mar. 7, 1967 and now abandoned.

The present invention relates to surface treatments for porous plastics materials. It is concerned particularly, but not exclusively, with treatments which give an artificial material a surface appearance resembling natural leather.

According to the present invention a method of treating at least one surface of a body, for example in the form of a sheet, of which at least the surface being treated consists of porous polymeric plastics material, involves the exposure of the surface to a solvent, the treatment solvent, for the plastics material so as to partially collapse the porous structure of the surface. The exposure may involve spraying the surface of the body.

In one form of the invention the exposure involves spraying the surface while a current of air is blown across the surface between the surface and the source of the spray, the conditions being selected so that the gas permeability of the treated surface is till appreciably greater than that of the polymeric material when in a non-porous state. The surface may be moved relatively to the source of the spray, for example it may be moved past the source of the spray. The source of the spray may be a spraygun utilizing air under pressure to form and propel the spray.

In one form of the invention the body may be made by a method, which will be referred to as a dunking method, which includes forming a mixture comprising the plastics material dissolved in a solvent, shaping the mixture, treating the shaped mixture with an inert liquid so as to cause the plastics material to come out of solution, and removing the solvent and the inert liquid so as to form a porous body. The mixture may include a removable solid filler and the inert liquid may be a non-solvent for the plastics material and may be used to remove the solvent and the solid filler and may then be itself removed by heating.

In another form of the invention the body may be made by a method which includes forming a mixture comprising the plastics material dissolved in a solvent and a removable solid filler which is insoluble in the solvent, shaping the mixture, heating the shaped mixture to remove the solvent, treating the dried shaped mixture with a solvent for the filler which is not a solvent for the plastics materials so as to remove the filler, and drying the resultant shaped porous body, and the treatment solvent may contain a minor proportion of a polymeric plastics material, the lacquer working material.

In another form of the invention, the body may again be porous and may be made by a method in which the plastic material containing removable solid filler is applied by a melt roll coating process.

The surface may comprise a polyurethane and the treatment solvent may be N,N-dimethylformamide (referred to hereinafter as DMF).

The current of air may be heated, for example to between 40° and 100° C.

The term polyurethane is to be understood in its broadest sense and includes any material derived from the reaction, between an isocyanate, such as a di-isocyanate, and a molecule, which will be called the polyurethane precursor, which should generally be a polymeric molecule, containing at least two groups, such as hydroxyl, amide, or amino groups, which contain hydrogen atoms capable of reaction with an isocyanate group. The poly-urethane precursor may be a polyester derivative, or a polyether diol, or a polyester amide.

The polyurethane used as the working material may be a thermoplastic elastomer having a low degree of cross-linking and thus may be a predominantly linear polymer. The molecular weight may be in the range 20,000 to 300,000.

The polyurethane may be derived from a polyester such as the proprietary material supplied by the B.F. Goodrich Chemical Company under the name Estane or by Elastomer Products Limited (Elastollan Limited) under the name Elastollan. An example of another suitable polyurethane is the proprietary material supplied by Monsanto Chemicals Limited under the name Texin.

Polyurethanes of the type disclosed and claimed in German Pat. Specification No. 1189268 are particularly suitable.

Each of the polyurethanes referred to are derived from an essentially linear polyester containing hydroxyl groups. The polyester is produced by reacting together adipic acid and ethlene glycol and preferably has a molecular weight of approximately 2,000. The polyurethane is derived from the polyester by reacting a minor proportion by weight of 1:4 butylene glycol with a major proportion by weight of the polyester at an elevated temperature, both the polyester and the glycol being dehydrated before being reacted together. The mixture of polyester and 1:4 butylene glycol is reacted with sufficient isocyanate to produce an essentially linear polyurethane, the isocyanate being 4:4' diphenyl methane di-isocyanate and the reaction being carried out at elevated temperatures.

According to the manufacturer's published specifications the Elastollan TN61EH90AK resin used in the following examples has the following characteristics when compression moulded to produce a non-porous structure such as a film or sheet (with further polymerization occurring, as is well known, during such moulding similar to the polymerization which occurs when the material is dissolved in a solvent such as dimethylformamide, probably due at least in part to further reaction occurring between previously unreacted hydroxyl and isocyanate groups which are present in the elastomeric material), has a Shore D hardness of 50± 3, a density of 1.23 g/cm$^3$; a tensile strength of over 450 Kg/cm$^3$, a modulus at 100 percent elongation of 120 Kg/cm$^3$, a modulus at 300 percent elongation of 180Kg/cm$^3$, an elongation at break of 450 percent (all as measured by DIN 53504); a "Stosselastizitat" of over 30 percent; a tear strength (Streifen, DIN 53507) of 50 Kg/cm; and a tear strength (Graves, DIN 53515) of 90 Kg/cm. The Estane polyurethanes, which are mentioned above, are described in the article by Stetz and Smith in Rubber Age May, 1965, pages 74 – 79 which refers to U.S. Pat. No. 2,871,218.

When the porous plastics material is one in which substantially all of the pores opening through the surface have a maximum dimension in the plane of the surface of less than 100 microns, the treatment solvent is preferably caused to impinge on the surface in a finely divided form so that substantially all of the droplets have a diameter between 1 and 30 microns when they impinge on the surface. When between 60 and 70 of the droplets have diameters in the range 1 to 10 microns useful deepenings in color and embossing effects tend to occur, so that the material takes on an appearance resembling natural calf grain leather.

The invention may be put into practice in various ways but three specific embodiments will be described by ways of example.

In the examples all parts are parts by weight.

The letters W.V.P. stand for water vapor permeability and the results are expressed in grams/sq. meter/24 hours and are determined by the method described in British Standard Specification 3177/1959 but carried out at 38° C with a nominal humidity gradient of 100 percent relative humidity.

The hydrostatic head values are determined by the method described in British Standard Specification No. 2825. Nominal pore sizes are expressed in microns and are determined by the method described in British Standard Specification No. 1752/1963 using n-propyl alcohol. Abrasion resistance, and flex life are measured by conventional methods.

In each example a replacement leather material suitable for use as a grain leather and made as described below has one surface treated in accordance with the present invention.

The replacement leather material has a fibrous base layer, a tie layer in accordance with the present Applicants' assignees co-pending British Pat. Specification No. 9977/66 (Case P.P.14) and a surface layer.

That British application has now issued as British Pat. No. 1148711. It discloses the formation of a tie layer by applying a layer of a solution of the polymer in a solvent which does not attack the polymer of the fibrous base layer and treating the layer of this solution so as to make it microporous. Details of the formation of a specific tie layer on a specific fibrous base layer are given below.

THE FIBROUS BASE LAYER

This is made from a felt made from staple nylon fibers by mechanical entangling involving a needle punching process but no shrinking stage. This is impregnated with a linear polyester based polyurethane (Elastollan TN61 EH90AK) as a 12 percent by weight solution in N,N'-dimethylformamide (DMF). The impregnated felt is immersed in water at 20° C, for approximately 1 minute. The impregnated felt with the polyurethane precipitated throughout its structure is left immersed in the water which is pumped past the impregnated felt so that the felt is continuously contacted with fresh water for 2 hours. The product emerges substantially free of all DMF and is dried at 90° C to produce a satisfactory supple product.

The felt before impregnation has the following properties:

Thickness — 4.3 mms.
Weight in grams/meter$^2$ — 653
Weight in grams/meter$^2$/mm. thickness — 141
Density — 0.9 grms/cc The following properties are all measured on a Houndsfield Tensometer.

Tensile strength extension percent and initial modulus are measured in a continuous test on a single sample.

The material to be tested has an L direction, the direction of travel of the material during its formation, and an X direction, the direction at right angles to the L direction. For each material separate tests are made in the L and X directions.

These are done on two samples 6 inches long and one-fourth inch wide cut from the material to be tested with the lengths of the samples parallel to the L and X directions of the material respectively.

The samples are mounted in the tensometer with their ends gripped in the jaws of the machine. The samples are then loaded to produce a constant rate of extension of 4 inches per minute.

The term Initial modulus (felt) used herein, is defined as the load in lbs/inch width of the sample/mm. thickness required to produce a 10 percent extension in length under these loading conditions.

The term Tensile strength used herein, is defined as the load in lbs/inch width/mm. thickness at which the sample ruptures under these loading conditions.

The term Extension percent as used herein, is defined as the percent increase in length of the sample at the time of rupture.

Tear strength is measured on a specially shaped sample. As for the other three properties the samples are 6 inches long and one-fourth inch wide and are cut with their lengths in the L and X directions respectively. In addition a small notch is cut at the mid point of one side and a small corresponding bulge is formed opposite the notch and extending outwards from the other side. The samples are in fact punched out of the material to be tested.

The notch propagates a tear in the test and the term Tear strength used herein, is defined as the load in lbs/mm. thickness required to rupture the sample Initial modulus (felt) — L 1.13 × 0.56
Tensile strength — L 24.6 × 55.0
Extension percent — L 125 × 100
Tear strength — L 8.9 × 14.6

THE TIE LAYER

The fibrous base zone is split to 1 mm thick sheets with a band knife. The smooth surface thus produced is doctor knife coated with a layer of the following mixture using a gap setting of 0.015 inches.

TIE LAYER WORKING MATERIAL 25

A thermoplastic polyester based polyurethane, the proprietary material sold by B.F.Goodrich Chemical Company under the name ESTANE 5701 F.1.
Solvent — dimethylcyclohexanone 75
Removable filler — sodium chloride 75.
   ground to a particle size range of 5–25 microns
Pigment 0.6
   The layer is then dried at 100° C.

THE SURFACE LAYER

The dried surface of the tie layer is doctor knife coated with a layer of the following mixture using a gap setting of 0.040 inches.
Surface working material 25

A thermoplastic polyester based polyurethane, the proprietary material sold by Elastollan Limited under the name Elastollan TN 61 EH 98 A.K.

Solvent — DMF 75
Removable filler — sodium chloride 75
  ground to a particle size range of 5–25 microns
Pigment 1.25

The composite material is then immersed in water at 20° C for 20 minutes and then washed with water at 80° C for 2 hours. The sheet is then dried at 100° C.

This sheet has the following properties:
WVP — 3500
Nominal pore size — 7.2 microns
Hydrostatic head — 40 mm. Hg.
Abrasion resistance — poor
Flex life — good.

EXAMPLE 1

The replacement leather material in the form of a long roll is supported on a stainless steel conveyor with its surface layer uppermost and carried at 2 ft/minute past a suitable spray-gun. The spray-gun is vertically above the sheet and points vertically downwards. The nozzle is 6 inches from the sheet. The spray-gun is arranged on a transverse slide and oscillated from side to side of the sheet at 50 passes per minute.

The treatment solvent may be N'N, dimethyl formamide ( referred to hereinafter as DMF), and is supplied to the spray gun at a rate such that approximately 1 ml. per square foot of surface is used. Air at 16 p.s.i. is also supplied to the spray gun.

Air is blown by suitable means counter current to the direction of travel of the sheet between the sheet and the spray-gun and generally parallel to the surface of the sheet. The velocity of the air adjacent the spray is 800 cu. ft/minute and the air is heated to 60° C.

The sheet after passing the spray-gun immediately enters an oven where it is heated at 120° C, to completely dry it.

The sheet has the following properties:
WVP - 2900
Nominal pore size — 4.0 microns
Hydrostatic head — 120 mm.Hg.
Abrasion resistance — good
Flex life — good

EXAMPLE 2

This is the same as Example 1 except that the treatment solvent, DMF, has lacquer working materials dissolved in it.

The treatment solvent has the following composition.
Treatment solvent — DMF 380
Lacquer working material — a polyurethane lacquer composition 16
  a polyurethane lacquer composition 4

The sheet has the following properties:
WVP — 2600
Nominal pore size — 3.4 microns
Hydrostatic head — 140 mm. Hg.
Abrasion resistance — good
Flex life — good

EXAMPLE 3

The sheet is first treated identically to Example 1.

The treated sheet is then retreated under the same conditions as Example 2 except that the treatment solvent, DMF, is replaced by cyclohexanone containing lacquer working materials. This treatment solvent has the same composition as that used in Example 2, the DMF being replaced by cyclohexanone.

The sheet has the following properties:
WVP — 2700
Nominal pore size — 2.1 microns
Hydrostatic head — 150 mm. Hg.
Abrasion resistance — good
Flex life — good It will be observed from the results given that materials in accordance with the present invention when compared with the untreated material have the following advantageous properties:

a. an increased resistance to the ingress of liquid water through the treated surface.
b. the treated surface has an increased abrasion resistance.
c. the treated surface has a reduced pore size, reducing the soiling tendency of the material.

In Addition d. the color of the surface darkens and becomes less matt in appearance and may even achieve a glossy appearance and
e. a leather-like "break" is achieved. By this is meant the appearance of the surface when the sheet is bent with the surface zone innermost a large number of fine lines being temporarily formed.

By varying the spraying conditions and the treatment solvent for any particular porous plastics material the surface appearance can be selected to range from a smooth glossy finish to a mottled appearance.

To obtain the effects described herein some experimentation will generally be needed, since the rate of application of solvent, spraying pressures, type and positioning of equipment, etc. will affect the character of the product. For instance, it is obviously possible, by applying sufficient solvent, to dissolve the entire microporous layer so that a non-porous film remains on evaporation of the solvent, or to entirely collapse the porous structure throughout the microporous layer, rather than partially collapse it a the surface. With the teachings herein of the effects to be attained, those skilled in the art will have no difficulty in making the simple trials, with appropriate equipment, needed to determine the best spraying conditions for that particular equipment and for the particular microporous sheet material and particular solvent which is used.

The application of a stream of hot air to the solvent-sprayed sheet has been found to make it much easier to obtain a high quality, generally finer grained, surface. One possible explanation for this is that the heat causes surface fusion of the solvent-carrying surface ( which has, of course, a lower fusion temperature than the solvent-free material) and that the evaporation occasioned by the high velocity air stream keeps the solvent from penetrating into the microporous material so that the solvent affects only the surface; this occurs even though the temperature is, as will be evident, well below the boiling point of the solvent.

It has been found that when the porous plastics material has been made by a melt roll coating process or by a dunking method, and in particular by the method described in the examples, by selecting the spraying conditions a surface finish closely approximating the surface finish, the so-called hair cell pattern, of natural calf leather can be obtained.

It will be appreciated that the smaller are the spray droplets produced by the spray-gun when they impinge on the surface the finer will be the indentations produced by them in the surface and the smoother the finish.

In this connection high speed photography has revealed that when Example 1 is carried out so that, of the droplets impinging on the surface, 67 percent have a diameter between 1 and 10 microns, 28 percent have a diameter between 10 and 20 microns, and 5 percent have a diameter between 20 and 25 microns a very satisfactory product is obtained. The color changes from light grey to a deep black and the surface takes on an appearance closely resembling that of a good quality calf grain leather.

An air pressure of 18 p.s.i. in Example 1 is found to produce these droplet size values and distributions when a Binks Bullows spray gun automatic type L 500 is used with an air nozzle Type A1S, a material nozzle Type A28 having a 28 thou. bore and a needle Type 2S occupying the bore.

If too low an air pressure is used the color change does not occur and the surface does not take on the desired grain appearance since the droplets coalesce and large uneven indentations are produced.

Thus if an air pressure of 5 p.s.i. is used, of the droplets impinging on the surface, none have a diameter between 1 and 10 microns, 65 percent have a diameter between 10 and 20 microns, and 35 percent have a diameter between 20 and 30 microns, and the surface does not resemble a grain leather.

If too high an air pressure is used, while the color change may occur, the surface does not take on the desired grain appearance since insufficient indentation or embossing of the surface occurs.

Thus if an air pressure of 50 p.s.i. is used, of the droplets impinging on the surface, 79 percent have a diameter between 1 and 10 microns, about 20 percent have a diameter between 10 and 20 microns and less than 1 percent have a diameter between 20 and 30 microns, and the surface once more does not resemble a grain layer, though the color change may be useful in achieving other finishes.

What I claim as my invention and desire to secure by Letters Patent is:

1. A method of imparting an overall grain leather-like appearance to a surface of flexible water vapor permeable sheet, said sheet including a microporous soluble polyurethane elastomer surface zone overall, substantially all of the pores opening through said surface having no dimension in the plane of the surface greater than 100 microns, said method comprising depositing a solvent for said polyurethane comprising dimethylformamide on said surface overall but in finely divided liquid form and heating said surface to remove the deposited solvent by evaporation, said liquid solvent being applied to said surface when said zone is dry and solid, said liquid solvent being applied in such finely divided form and in such amount that the porous structure at said surface is partially collapsed by the treatment and said surface increases in gloss and in resistance to ingress of liquid water therethrough but remains permeable to water vapor, said solvent being a solvent for said soluble polyurethane elastomer under the conditions of the process.

2. Process as in claim 1 in which said flexible sheet used as the starting material has a colored surface and the color of said surface is darkened and made less matt by said solvent deposition and heating.

3. Process as in claim 2 in which a spray of said solvent is directed at the surface of the sheet and traversed back and forth across the surface of the sheet while the sheet moves transversely to the direction of spraying and a current of heated air is blown at the sprayed surface of the sheet.

4. Process as in claim 3 in which the current of air is at a temperature of 40° to 100° C.

5. Process as in claim 2, in which said heating is by a current of heated air at 40° to 100° C., the polyurethane is a linear thermoplastic elastomer having a molecular weight in the range of 20,000 to 300,000 and being soluble in dimethylformamide, and said deposited solvent comprises dimethylformamide.

6. Process as in claim 5 in which said elastomer is obtained by reacting a linear polyester having hydroxyl groups and a diisocyanate.

7. Process as in claim 5 in which said microporous soluble polyurethane elastomer surface zone is one obtained, from a mixture of sodium chloride particles of 5 to 25 micron particle size with a solution of said polyurethane elastomer in dimethylformamide, by shaping said mixture, contacting said mixture with water to cause the polyurethane to come out of solution, to remove the dimethylformamide and to extract the sodium chloride, and then drying the shaped mixture to remove the water, said finely divided liquid being applied in such amount and such finely divided form as to indent said surface.

* * * * *